US006440888B1

(12) United States Patent
Stamires et al.

(10) Patent No.: US 6,440,888 B1
(45) Date of Patent: Aug. 27, 2002

(54) PROCESS FOR PRODUCING AL-CONTAINING NON-MG-ANIONIC CLAY

(75) Inventors: Dennis Stamires, Newport Beach, CA (US); William Jones, Cambridge (GB)

(73) Assignee: Akzo Nobel N.V., Arnhem (NL)

( * ) Notice: Subject to any disclaimer, the term of this patent is extended or adjusted under 35 U.S.C. 154(b) by 57 days.

(21) Appl. No.: 09/637,245

(22) Filed: Aug. 11, 2000

Related U.S. Application Data

(60) Provisional application No. 60/148,245, filed on Aug. 11, 1999.

(51) Int. Cl.$^7$ .......................... B01J 21/02; C04B 33/02; C01F 7/44
(52) U.S. Cl. ...................... 502/80; 423/420.2; 423/600; 501/141; 106/632
(58) Field of Search ...................... 252/315.5; 106/632; 502/80; 501/141; 423/420.2, 600

(56) References Cited

U.S. PATENT DOCUMENTS

| | | | |
|---|---|---|---|
| 3,796,792 A | 3/1974 | Miyata et al. | 423/250 |
| 3,879,523 A | 4/1975 | Miyata et al. | 423/250 |
| 3,879,525 A | 4/1975 | Miyata et al. | 423/277 |
| 4,351,814 A | 9/1982 | Miyata et al. | 423/306 |
| 4,458,026 A | 7/1984 | Reichle | 502/80 |
| 4,656,156 A | 4/1987 | Misra | 502/415 |
| 4,904,457 A | 2/1990 | Misra | 423/115 |
| 4,946,581 A | 8/1990 | Van Broekhoven | 209/120 |
| 4,952,382 A | 8/1990 | van Broekhoven | 423/244 |
| 5,079,203 A | 1/1992 | Pinnavaia et al. | 502/84 |
| 5,114,898 A | 5/1992 | Pinnavaia et al. | 502/406 |
| 5,399,537 A | 3/1995 | Bhattacharyya et al. | 502/84 |
| 5,439,861 A | 8/1995 | Bhattacharyya et al. | 502/84 |
| 5,507,980 A | 4/1996 | Kelkar et al. | 264/15 |
| 5,518,704 A | 5/1996 | Kelkar et al. | 423/420.2 |
| 5,578,286 A | 11/1996 | Martin et al. | 423/593 |
| 5,591,418 A | 1/1997 | Bhattacharyya et al. | 423/239 |
| 5,728,364 A | * 3/1998 | Martin et al. | 423/593 |
| 5,814,291 A | * 9/1998 | Kelkar | 423/395 |
| 6,171,991 B1 | * 1/2001 | Stamires et al. | 501/141 |

FOREIGN PATENT DOCUMENTS

| | | | |
|---|---|---|---|
| EP | 0 536 879 | 4/1993 | C01G/1/00 |
| WO | WO/91/10505 | 7/1991 | B01J/8/00 |
| WO | WO/91/18670 | 12/1991 | B01J/20/02 |
| WO | WO 01/12543 | * 2/2001 | |

OTHER PUBLICATIONS

*Materials Chemistry and Physics, Textural Properties of Hydrotalcite–Like Compounds...* 14, pp. 569–579 (1986).
*Clays and Clay Minerals, Syntheses of Disordred and Al–Rich Hydrotalcite–Like Compounds* 34, pp. 507–510, vol. 34, No. 5, (1986).

*Clays and Clay Minerals, Physico–Chemical Properties of Synthetic Hydrotalcites in Relation to Composition*, vol. 28, No. 1, pp. 50–56, (1980).

*Clays and Clay Minerals, The Syntheses of Hydrotalite–Like Compounds and Their Structures and Physico–Chemical...*, vol. 23, pp. 369–375, (1975).

*J. Am. Ceram. Soc., Studies on $4CaO–Al_2O_3–13H_2O$ and the Related Natural Mineral Hydrocalumite* 42, No. 3, pp. 121–126, (1959).

*Chemistry Letters, Synthesis of New Hydrotalcit–Like Compounding and Their Physico–Chemical Properties*, pp. 843–848, (1973).

*Anionic Clays: trends in pillary chemistry, its synthesis and microporous solids* (1992), 2, pp. 108–165.

*Catalysis Today, Hydrotalcity–Type Anionic Clays: Preparation, Properties and Applications* 11, pp. 173–301, (1991).

*Clays and Clay Minerals, Polytype Diversity of The Hydrotalicte–Like Minerals II. Determination of the Polytpes of Experimentally Studied Varieties*, vol. 41, No. 5, 558–564, 1993.

*Clays and Clay Minerals, , Polytype Diversity of the Hydrotalicity–Like Minerals I. Possible Polytypes and their Diffration Features*, vol. 14, No. 5, 551–557, 1993.

C.P. Kelkar, et al., *Ni–, Mg–and Co–containing hydrotalcite–like materials with a sheet–like morphology: synthesis and characterization*, Microporous Materials, 10 (1997) pp. 163–172.

*Helv. Chim. Acta*, 25 pp. 106–137 and 555–569 (1942).

* cited by examiner

Primary Examiner—Mark Kopec
(74) Attorney, Agent, or Firm—Louis A. Morris

(57) ABSTRACT

This patent describes economical and environment-friendly processes for the synthesis of Al-containing non-Mg anionic clays. It involves hydrothermally reacting a slurry comprising a divalent metals source with a trivalent metals source to directly obtain Al-containing non-Mg anionic clay, at least one of the metal sources being an oxide, hydroxide or a carbonate. There is no necessity to wash or filter the product. It can be spray dried directly to form microspheres or can be extruded to form shaped bodies. The product can be combined with other ingredients in the manufacture of catalysts, absorbents, pharmaceuticals, cosmetics, detergents, and other commodity products that contain anionic clays.

12 Claims, No Drawings

PROCESS FOR PRODUCING AL-CONTAINING NON-MG-ANIONIC CLAY

CROSS REFERENCE TO RELATED APPLICATION

This application claims the benefit of Provisional Application 60/148,245, filed on Aug. 11, 1999. The entire content of which is incorporated by reference herein.

BACKGROUND OF THE INVENTION

1. Field of the Invention

This invention involves the preparation of Al-containing non-Mg anionic clays.

2. Description of the Prior Art

Anionic clays have a crystal structure which consists of positively charged layers built up of specific combinations of metal hydroxides between which there are anions and water molecules. Hydrotalcite is an example of a naturally occurring anionic clay, in which carbonate is the predominant anion present. Meixnerite is an anionic clay wherein $OH^-$ is the predominant anion present.

In hydrotalcite-like anionic clays the brucite-like main layers are built up of octahedra alternating with interlayers in which water molecules and anions, more particularly carbonate ions, are distributed. The interlayers contain anions such as $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{-6}$ and $MO_7O_{24}^{6-}$, mono-carboxylates such as acetate, dicarboxylates such as oxalate, alkyl sulphonates such as laurylsulphonate.

It should be noted that a variety of terms is used to describe the material which is referred to in this patent as an anionic clay. Hydrotalcite-like and layered double hydroxide are interchangeably used by those skilled in the art. In this patent application we refer to the materials as anionic clays, comprising within that term hydrotalcite-like and layered double hydroxide materials.

The most commonly described anionic clays are Mg-Al anionic clays. In the prior art the emphasis is usually on these types of anionic clays, whereas the Al-containing non-Mg anionic clays are only mentioned in passing, even though the chemistry of their preparation and their properties can be very different and unpredictable. Mg-Al anionic clays are suitable for many applications in the absorbent and catalysts field, but Al-containing non-Mg anionic clays have specific applications in these fields.

The preparation of anionic clays has been described in many prior art publications. Two major reviews of anionic clay chemistry were published in which the synthesis methods available for anionic clay synthesis have been summarized, F. Cavani et al "Hydrotalcite-type anionic clays: Preparation, Properties and Applications, "*Catalysis Today*", 11 (1991) Elsevier Science Publishers B. V. Amsterdam. J P Besse and others "*Anionic clays: trends in pillaring chemistry, its synthesis and microporous solids*"(1992), 2, 108, editors: M. I. Occelli, H. E. Robson, Van Nostrand Reinhold, N.Y.

In these reviews basically two types of anionic clay preparation are described. The most conventional method is co-precipitation (in Besse this method is called the salt-base method) of a soluble divalent metal salt and a soluble trivalent metal salt, optionally followed by hydrothermal treatment or aging to increase the crystallite size. The second method is the salt-oxide method in which a divalent metal oxide is reacted at atmospheric pressure with a soluble trivalent metal salt, followed by aging under atmospheric pressure. This method has only been described for the use of ZnO and CuO in combination with soluble trivalent metal salts.

For work on anionic clays, reference is given to the following articles:

*Helv. Chim. Acta*, 25, 106–137 and 555–569 (1942)
*J. Am. Ceram. Soc.*, 42, no. 3, 121 (1959)
*Chemistry Letters (Japan)*, 843 (1973)
*Clays and Clay Minerals*, 23, 369 (1975)
*Clays and Clay Minerals*, 28, 50 (1980)
*Clays and Clay Minerals*, 34, 507 (1996)
*Materials Chemistry and Physics*, 14, 569 (1986).

In addition there is an extensive amount of patent literature on the use of anionic clays and processes for their preparation.

European Patent Application 0 536 879 describes a method for introducing pH-dependent anions into the clay. The clay is prepared by the addition of a solution of $Al(NO_3)_3$ and $Mg(NO_3)_2$ to a basic solution containing borate anions. The product is then filtered, washed repeatedly with water, and dried overnight. Additionally mixtures of Zn/Mg are used.

In U.S. Pat. No. 3,796,792 by Miyata et al. entitled "Composite Metal Hydroxides" a range of materials is prepared into which an extensive range of cations is incorporated, including Sc, La, Th, In, etc. In the examples given solutions of the divalent and trivalent cations are prepared and mixed with base to cause co-precipitation. The resulting products are filtered, washed with water, and dried at 80° C. Example 1 refers to Mg and Sb and Example 3 to Mg and Bi. Other examples are given, and in each case soluble salts are used to make solutions prior to precipitation of the anionic clay at high pH.

In U.S. Pat. No. 3,879,523 by Miyata entitled "Composite Metal Hydroxides" also a large number of preparation examples is outlined. The underlying chemistry, however, is again based on the co-precipitation of soluble salts followed by washing and drying. It is important to emphasize that washing is a necessary part of such preparations, because to create a basic environment for co-precipitation of the metal ions a basic solution is needed and this is provided by $NaOH/Na_2CO_3$ solutions. Residual sodium, for example, can have a significant deleterious effect on the subsequent performance of the product as a catalyst or oxide support.

In U.S. Pat. No. 3,879,525 (Miyata) very similar procedures are again described.

In U.S. Pat. No. 4,351,814 to Miyata et al. a method for making fibrous hydrotalcites is described. Such materials differ in structure from the normal plate-like morphology. The synthesis again involves soluble salts. For example, an aqueous solution of a mixture of $MgCl_2$ and $CaCl_2$ is prepared and suitably aged. From this a needle-like product $Mg_2(OH)_3Cl.4H_2O$ precipitates. A separate solution of sodium aluminate is then reacted in an autoclave with the solid $Mg_2(OH)_3Cl.4H_2O$ and the product is again filtered, washed with water, and dried.

In U.S. Pat. No. 4,458,026 to Reichle, in which heat-treated anionic clays are described as catalysts for aldol condensation reactions, again use is made of magnesium and aluminum nitrate salt solutions. Such solutions being added to a second solution of NaOH and $Na_2CO_3$. After precipitation the slurry is filtered and washed twice with distilled water before drying at 125° C.

In U.S. Pat. No. 4,656,156 to Misra the preparation of a novel absorbent based on mixing activated alumina and hydrotalcite is described. The hydrotalcite is made by reacting activated MgO (prepared by activating a magnesium compound such as magnesium carbonate or magnesium hydroxide) with aqueous solutions containing aluminate, carbonate and hydroxyl ions. As an example the solution is made from NaOH, $Na_2CO_3$ and $Al_2O_3$. In particular, the synthesis involves the use of industrial Bayer liquor as the source of Al. The resulting products are washed and filtered before drying at 105° C.

In U.S. Pat. No. 4,904,457 to Misra a method is described for producing hydrotalcites in high yield by reacting activated magnesia with an aqueous solution containing aluminate, carbonate, and hydroxyl ions.

The methodology is repeated in U.S. Pat. No. 4,656,156.

In U.S. Pat. No. 5,507,980 to Kelkar et at al. a process is described for making novel catalysts, catalyst supports, and absorbers comprising synthetic hydrotalcite-like binders. The synthesis of the typical sheet hydrotalcite involves reacting pseudo-boehmite to which acetic acid has been added to peptize the pseudo-boehmite. This is then mixed with magnesia. More importantly, the patent summary states clearly that the invention uses mono carboxylic organic acids such as formic, propionic and isobutyric acid. In this patent the conventional approaches to preparing hydrotalcites are presented.

In U.S. Pat. No. 6,539,861 a process is disclosed for preparing a catalysts for synthesis gas production based on hydrotalcites. The method of preparation is again based, on the co-precipitation of soluble salts by mixing with base, for example, by the addition of a solution of $RhCl_3$, $Mg(NO_3)_2$ and $Al(NO_3)_3$ to a solution of $Na_2CO_3$ and NaOH.

Also in U.S. Pat. No. 5,399,537 to Bhattacharyya in the preparation of nickel-containing catalysts based on hydrotalcite use is made of the co-precipitation of soluble magnesium and aluminum salts.

In U.S. Pat. No. 5,591,418 to Bhattacharyya a catalyst for removing sulfur oxides or nitrogen oxides from a gaseous mixture is made by calcining an anionic clay, said anionic clay having been prepared by co-precipitation of a solution of $Mg(NO_3)_2$, $Al(NO_3)_3$ and $Ce(NO_3)_3$. The product again is filtered and repeatedly washed with de-ionized water.

In U.S. Pat. No. 5,114,898/WO 9110505 Pinnavaia et al. describe layered double hydroxide sorbents for the removal of sulfur oxide(s) from flue gases, which layered double hydroxide is prepared by reacting a solution of Al and Mg nitrates or chlorides with a solution of NAOH and $Na_2CO_3$. In U.S. Pat. No. 5,079,203 /WO 9118670 layered double hydroxides intercalated with polyoxo anions are described, with the parent clay being made by co-precipitation techniques.

In U.S. Pat. No. 5,578,286 in the name of Alcoa a process for the preparation of meixnerite is described. Said meixnerite may be contacted with a dicarboxylate or polycarboxylate anion to form a hydrotalcite-like material.

In U.S. Pat. Nos. 4,946,581 and 4,952,382 to van Broekhoven co-precipitation of soluble salts such as $Mg(NO_3)_2$ and $Al(NO_3)_3$ with, and without the incorporation of rare earth salts was used for the preparation of anionic clays as catalyst components and additives. A variety of anions and di- and tri-valent cations are described.

U.S. Pat. No. 5,518,704 describes the preparation of a nickel-Al hydrotalcite prepared from peptized pseudoboehmite and nickel hydroxide.

As indicated in the description of the prior art given above, there are many applications of anionic clays. These include but are not restricted to: catalysts, adsorbents, drilling muds, catalyst supports and carriers, extenders and applications in the medical field. In particular van Broekhoven has described their use in $SO_x$ abatement chemistry.

Because of this wide variety of large-scale commercial applications for these materials, new processes utilizing alternative inexpensive raw materials are needed to provide a more cost-effective and environmentally compatible processes for making anionic clays. In particular, from the prior art described above one can conclude that the preparation process can be improved in the following ways: the use of cheaper sources of reactants, processes for easier handling of the reactants, so that there is no need for washing or filtration, eliminating the filtration problems associated with these fine-particled materials, the avoidance of alkali metals (which can be particularly disadvantageous for certain catalytic applications): Further, in drying or calcining the anionic clay prepared by prior art processes gaseous emissions of nitrogen oxides, halogens, sulfur oxides, etc. are encountered which cause environmental pollution problems.

SUMMARY OF THE INVENTION

Our invention in its broadest embodiment comprises a process for the preparation of an aluminum-containing non-Mg anionic clay wherein a suspension comprising an aluminum source and a divalent metal source is provided and reacted, optionally under hydrothermal conditions, to obtain an aluminum-containing non-Mg-anionic clay, the aluminum source being aluminum trihydrate or its thermally treated form, and the divalent metal source not being a magnesium source.

Other objectives and embodiments of our invention encompass details about compositions, manufacturing steps, etc., all of which are hereinafter disclosed in the following discussion of each of the facets of the present invention.

DETAILED DESCRIPTION OF THE INVENTION

This invention involves the preparation of Al-containing non-Mg anionic clays. In particular it describes a process for the preparation of an anionic clay wherein a suspension comprising an aluminum source and a divalent metal source is provided and reacted thermally or hydrothermally to obtain a Al-containing non-Mg anionic clay, the aluminum source being aluminum trihydrate or its thermally treated form.

The powder X-ray diffraction pattern (PXRD) of the product of the invention suggests that the product is comparable to anionic clays made by other standard methods. The physical and chemical properties of the product are also comparable to those anionic clays made by the other conventional methods. The overall process of this invention is very flexible, enabling a wide variety of anionic clay compositions and anionic clay-like materials involving for example carbonate, hydroxide and other anions to be prepared in an economically and environmental-friendly manner. The process may be carried out in a one-step process either in batch or in continuous mode.

It was found that Al-containing non-Mg anionic clays are directly obtained from the reaction according to the invention. This is in contrast to the coprecipitation method wherein soluble salts are first precipitated, filtered, washed to remove unwanted ions and then aged either hydrothermally or not. With the process according to the invention the presence of unwanted ions in the product can be avoided, as will be explained below.

The aluminum source is aluminum trihydrate or its thermally treated form. This alumina source is much less expensive than the usual aluminum sources such as aluminum salts or peptized boehmites. From this compound no ions beside hydroxide end up in the anionic clay, which is one of the normal building blocks of anionic clays. If for the divalent metal source a compound is chosen with harmless ions such as nitrate or acetate washing and filtration of the reaction product can be avoided altogether. In fact, it was found that the reaction also takes place when using hydroxides, oxides, hydroxycarbonates or carbonates for the divalent metal source in combination with the aluminum trihydrate or its thermally treated form, in which case also no washing and filtration has to take place.

Since the process disclosed in this patent does not require washing of the product or filtering, there is no filtrate waste or gaseous emissions (e.g. from acid decomposition), making the process particularly environmental-friendly and more suited to the environmental constraints which are increasingly imposed on commercial operations. The product can be spray dried directly to form microspheres or can be extruded, pelletized or beaded to form shaped bodies.

Anionic clays prepared by this method exhibit the well known properties and characteristics (e.g. chemical analysis, powder X-ray diffraction pattern, FTIR, thermal decomposition characteristics, surface area, pore volume, and pore size distribution) usually associated with anionic clays prepared by the customary and previously disclosed methods.

The anionic clay according to the invention has a layered structure corresponding to the general formula

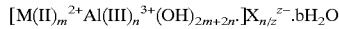

Wherein m and n have a value such that m/n=1 to 10, preferably 1 to 6, and b has a value in the range of from 0 to 10, generally a value of 2 to 6 and often a value of about 4. X may be $CO_3^{2-}$, $OH^-$ or any other anion normally present in the interlayers of anionic clays. It is more preferred that m/n should have a value of 2 to 4, more particularly a value close to 3.

The Trivalent Metal Source

In addition to the aluminum trihydrate or its thermally treated form which is the main trivalent metal source, other trivalent metal sources such as compounds containing $Al^{3+}$, $Mn^{3+}$, $Fe^{3+}$, $Co^{3+}$, $Ni^{3+}$, $Cr^{3+}$, $Ga^{3+}$, $B^{3+}$, trivalent rare earth metal cations such as $La^{3+}$ and $Ce^{3+}$, $Ga^{3+}$ or mixtures of said compounds may be added. Preferably oxides, hydroxides and carbonates of these metals are used, but also nitrate chlorides, sulfates and phosphates can be used.

Divalent Metal Source

Suitable divalent metal sources are compounds containing $Ca^{2+}$, $Zn^{2+}$, $Mn^{2+}$, $Co^{2+}$, $Mo^{2+}$, $Ni^{2+}$, $Fe^{2+}$, $Sr^{2+}$, $Ba^{2+}$, $Cu^{2+}$, and mixtures of said compounds. Prefer oxides, hydroxides and carbonates of these metals are used, but also nitrates chlorides, sulfates and phosphates can be used.

Conditions

As mentioned above, the reaction is conducted under thermal or hydrothermal conditions. Within the context of this description hydrothermal means in the presence of water at at a temperture above 100° C. at increased pressure. Thermal means at a temperature between ambient and 100° C. Preferably the reaction takes place in water in an autoclave at a temperature above 100° C., i.e. under autogeneous pressure.

It is possible to purge the suspension with nitrogen or inert gas if an anionic clay with predominantly hydroxide anions are desired, but in general this is not necessary. Thus, the reaction can be conducted in the presence of $CO_2$. Said $CO_2$ may be the $CO_2$ normally present in air or it may be added to the reaction, for instance, by using a carbonate divalent or trivalent metal source.

Said aqueous suspension may be obtained by either combining slurries of the starting materials or adding divalent metal source to a slurry of trivalent metal source or vice versa. There is no need to wash or filter the product, as unwanted ions (e.g. sodium, ammonium, chloride, sulfate) which are frequently encountered when using other preparation methods, are absent in the product. If desired a preformed anionic clay may be added to the reaction mixture. Said preformed clay may be recycled anionic clay from the reaction mixture or anionic clay made separately by the process according to the invention or any other process.

"Because of its simplicity, this process can be carried out in a continuous mode."

As mentioned-above, if desired inorganic acids and bases, for example for control of the pH, may be added to the slurry before or during reaction or to the individual reactants before combining them in the slurry. The acid and bases of choice are formic acid, acetic acid, nitric acid and ammonium hydroxide, because these types of acids and bases do not introduce unwanted ions in the reaction mixture.

The most preferred combinations of divalent metal sources and Al sources are Al—Zn, and Al—Cu, because these combinations result in Al-containing non-Mg anionic clays with specific applications in the catalyst field.

If desired, the anionic clay prepared by the process according to the invention may be subjected to ion exchange. Upon ion exchange the interlayer charge-balancing anions are replaced with other anions. Said other anions are the ones commonly present in anionic clays and include pillaring anions such as $V_{10}O_{28}^{-6}$, $Mo_7O_{24}^{6-}$. Said ion exchange can be conducted before drying or after the anionic clay formed in the slurry.

The process of the invention provides wide flexibility in preparing products with a wide range of M(II):Al(III) ratios. The M(II):Al(III) ratio can vary from 0.1 to 10, preferably from 1 to 6, more preferred from 2 to 4, and especially preferred to close to 3.

For some applications it is desirable to have additives, both metals and nonmetals, such as rare earth metals, Si, P, B, group VI, group VIII, alkaline earth (for instance Ca and Ba) and/or transition metals (for example Mn, Fe, Co, Ti, Zr, Cu, Ni, Zn, Mo, Sn), present. Said metals can easily be deposited on the anionic clay. They can also be added either to the divalent metal source or the trivalent metal source or to the slurry during preparation of the anionic clay.

The present invention is illustrated by the following examples which are not to be considered limitative by any means.

EXAMPLES

Example 1

A slurry was provided of Cp® alumina (flash calcined alumina) and zinc nitrate with a Zn/Al ratio=2.3. The slurry was aged at 65° C. for 18 hours. The product was dried at 90° C. X-ray diffraction showed the characteristic anionic clay reflections at 7.52 and 3.76 Å.

Example 2

A solution of zinc nitrate was adjusted to pH 9 with NaOH and Cp® alumina (flash calcined alumina) (Zn/Al ratio= 2.0). The mixture was then treated at 65° C. for 6 hours and the product dried at 90° C.

Example 3

A slurry was provided of gibbsite and zinc oxide with a Zn/Al ratio=2.3. The slurry was aged at 90° C. for 18 hours. The product was dried at 90° C.

Example 4

A solution of copper nitrate was introduced into a slurry containing Cp alumina with a mole ratio Cu/Al of about 2. Temperature was raised to 160° C. in an autoclave and the slurry was treated for 1 hour. The product was filtered, washed and dried at 120° C. XRD analysis indicated the product to be an Cu—Al—LDH.

Example 5

Example 4 was repeated except that the Cp alumina was replaced with Gibbsite. The product according to XRD was a Cu—Al—LDH.

Example 6

Example 5 was repeated except that the cupper nitrate was replaced with ferrous nitrate. According to XRD the product was FE—Al—LDH.

What is claimed is:

1. A process for the preparation of an aluminum-containing non-Mg anionic clay wherein a suspension comprising an aluminum source and a divalent metal source is provided and reacted to obtain an aluminum-containing non-Mg-anionic clay, the aluminum source being aluminum trihydrate or its thermally treated form, and the divalent metal source not being a magnesium source.

2. The process of claim 1 wherein in addition to aluminum trihydrate or its thermally treated form an additional trivalent metal source is added which is a compound containing $Al^{3+}$, $Mn^{3+}$, $Co^{3+}$, $Ni^{3+}$, $Cr^{3+}$, $Fe^{3+}$, $Ga^{3+}$, $Sc^{3+}$, $B^{3+}$, trivalent rare earth cations, or a mixture of said compounds.

3. The process of claim 2 wherein said trivalent rare earth cautions comprise $La^{3+}$ or $Ce^{3+}$.

4. The process of claim 1 wherein the divalent metal source is a compound containing $Ca^{2+}$, $Zn^{2+}$, $Mn^{2+}$, $Mo^{2+}$, $Co^{2+}$, $Ni^{2+}$, $Fe^{2+}$, $Sr^{2+}$, $Ba^{2+}$, $Cu^{2+}$, and mixtures of said compounds.

5. The process of claim 1 wherein the divalent metal source is an oxide, hydroxide or carbonate.

6. The process of claim wherein acid or base is present in the suspension.

7. The process of claim 1 wherein the process is carried out in a continuous mode.

8. The process according of claim 1 wherein additives are present in the suspension.

9. The process of claim 1 wherein the Al-containing non-Mg anionic clay is subjected to an ion-exchange treatment.

10. The process of claim 9 wherein the Al-containing non-Mg anionic clay is ion exchanged with pillaring anions.

11. The process of claim 10 wherein said pillaring anions comprise $V_{10}O_{28}^{6-}$ or $Mo_7O_{24}^{6-}$.

12. The process of claim 1 wherein additives are deposited on the Al-containing non-Mg anionic clay.

* * * * *